Figure 1:
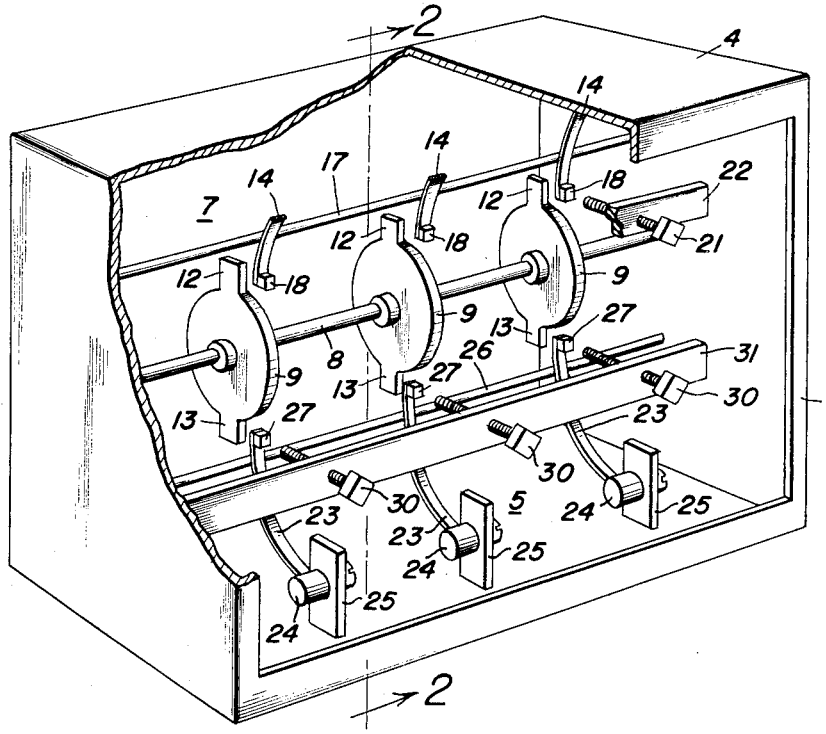

July 4, 1961  LA VERGNE E. WILLIAMS ET AL  2,991,339

ANGULAR ACCELEROMETERS

Filed Sept. 25, 1957

INVENTORS.
LA VERGNE E. WILLIAMS
GEORGE BIRKEL, JR.
BY Hurvitz & Rose
ATTORNEYS

United States Patent Office 2,991,339
Patented July 4, 1961

2,991,339
ANGULAR ACCELEROMETERS
La Vergne E. Williams, Melbourne, and George Birkel, Jr., Eau Gallie, Fla., assignors to Radiation, Inc., Melbourne, Fla., a corporation of Florida
Filed Sept. 25, 1957, Ser. No. 686,103
9 Claims. (Cl. 200—61.46)

The present invention relates to angular accelerometers and more particularly to an angular accelerometer for producing indications of angular acceleration in digital form.

The prior art provides several types of angular accelerometers for producing digital indications of the angular acceleration being measured. These prior art accelerometers are usually variations of a basic instrument which takes the form of a mass mounted on one end of a spring, the other end of which is secured to a fixed member in such a way that the combination of the mass and spring responds only to angular acceleration and is non-responsive to linear acceleration. Each distinct indication of acceleration is produced in response to a predetermined increase in acceleration of the system over that required to produce the immediately preceding digital indication of acceleration. Difficulties arise in the prior art systems in consequence of the utilization of a single mass and spring arrangement for sensing and indicating discrete incremental increases in angular acceleration over an entire range of accelerations. It can be shown that if a natural resonant frequency of ten cycles per second is chosen for the apparatus and a separation between discrete digital indications of acceleration is taken as 0.1 radian per second per second that an angular displacement per data step or indications of the order of $2.5 \times 10^{-5}$ radians is required. In order to translate a rotational displacement of $2.5 \times 10^{-5}$ radians to a linear displacement of 10 mils when employing a single mass and spring arrangement, a mass system having a radius of approximately 400 inches is required. Obviously such a requirement greatly restricts the utility of such an apparatus.

It is an object of the present invention to provide an angular accelerometer of small size for producing digitalized indications of angular acceleration.

It is another object of the present invention to provide an angular accelerometer for producing digitalized indications of angular acceleration, wherein the steps between the discrete digital indications are completely independently adjustable.

In accordance with the present invention there is provided an angular accelerometer employing a plurality of rotatable circular discs mounted for independent relative rotation about a common shaft. Each disc is provided with two diametrically-opposed, radial shoulders each of which is adapted to close a pair of contacts of a distinct switch upon the disc being subjected to a predetermined angular acceleration of the proper sense. One contact of each pair of contacts of a switch is carried on an end of a cantilever spring positioned in the path of rotation of one of the shoulders on its associated disc. Each spring is adapted to engage a stop and is secured at its end remote from the contact to a rotatable post which may be rotated to bring the cantilever spring into engagement with its associated stop and to control thereby the bending moment in the spring independently of the position of its associated disc. Normally, the shoulder on the disc does not contact the spring. Upon the apparatus being subjected to angular acceleration, the shoulder contacts the spring and if the acceleration forces are sufficiently great, the bending moment of the spring is overcome and the switch contacts are closed to produce a distinct indication of acceleration.

A plurality of discs are employed and the spring associated with each of these discs is initially subjected to a different bending moment from the other springs of the apparatus. In consequence, the closing of the switches associated with each of the springs is effected in response to different angular accelerations which are independently controllable by pre-tensioning of the springs. Each switch is connected in a distinct electric circuit so that distinct indications may be obtained. The other shoulder on each of the discs is employed in conjunction with a spring and switch arrangement similar to that described above but utilized to sense angular acceleration opposite to that sensed by the other shoulder, spring and switch arrangement. In consequence, a single mass may be employed to sense acceleration of the apparatus in both directions. Since the bending moment initially imparted to each of the springs associated with a given mass are independently adjustable, the two distinct accelerations sensed by a single disc are also independently adjustable. The spacing between each of the pairs of the switch contacts is independently adjustable and normally the spacing is maintained quite small. In consequence, the total movement of each rotational mass may be maintained extremely small and therefore the response time of the apparatus is small so that the system may be operated at frequencies far in excess of the natural resonant frequency of the mass-spring combination.

A further desirable feature of the apparatus is that the utilization of circular discs provide masses which may be readily dynamically balanced and therefore made quite insensitive to linear accelerations. The apparatus may be maintained quite small since the spacing between the independently rotatable discs may be minimal, there being no interaction in consequence of the close spacing. The main determining factor of the size of the apparatus is the size of the rotatable masses which normally are all of the same size and weight, the accelerations to which the various switches respond being controlled normally by the tensioning in the switches. It is to be understood, of course, that if the incremental steps to which the various masses are to respond are widely separated, the rotatable masses may be of different moments of intertia.

It is, therefore, another object of the present invention to provide an angular accelerometer employing a plurality of independently rotatable circular discs for closing a plurality of spring biased contacts wherein each of the spring biased contacts may be adjusted to be closed in response to a distinct acceleration force.

It is another object of the present invention to provide an angular accelerometer employing a plurality of independently rotatable discs and a plurality of spring biased switches wherein the springs of the switches are employed as the spring of the usual mass-spring accelerometer combination.

Yet another object of the present invention is to provide an angular accelerometer employing a plurality of mass-spring acceleration sensing elements that may be operated at frequencies well above their resonant frequencies.

Figure 2:
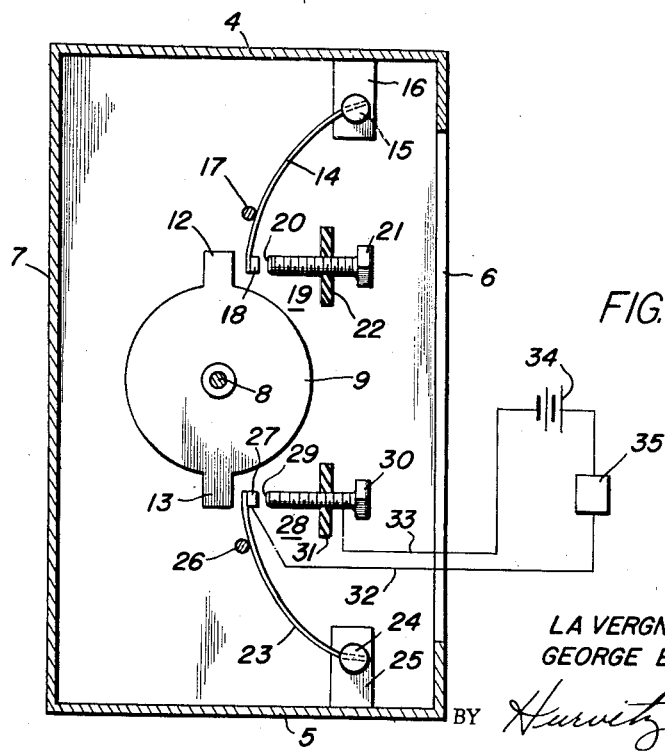

The above and still further objects, features and advantages of the present invention will become apparent upon consideration of the following detailed description of one specific embodiment thereof, especially when taken in conjunction with the accompanying drawings, wherein:

FIGURE 1 is a perspective view in elevation of the apparatus of the present invention with the front wall removed; and FIGURE 2 is a sectional view taken along line 2—2 of FIGURE 1.

Referring specifically to FIGURE 1 of the accompanying drawings there is illustrated an accelerometer generally designated by the numeral 1 having a casing comprising end walls 2 and 3, top wall 4, bottom wall 5 and front and back walls 6 and 7, respectively. Secured between the end walls 2 and 3 and generally parallel to the remaining walls of the enclosure of the apparatus is a shaft 8 having rotatably mounted thereon a plurality of dynamically-balanced discs 9, 10 and 11, only three such discs being illustrated for the purposes of explanation. It is to be understood that any number of discs desired may be employed in the apparatus, the actual number being determined by the number of distinct indications desired. Each of the discs 9, 10 and 11 constitutes an angular acceleration responsive mass which may or may not be identical in weight and size with each of the other discs in the apparatus, the relative weights and sizes of the discs being determined by the range of accelerations to be sensed.

Each of the discs 9, 10 and 11 is provided with diametrically-opposed, radial shoulders 12 and 13 illustrated as appearing on the uppermost and lowermost portions of the circumference of the discs. Disposed in the clockwise path of rotation of each of the shoulders 12 is one end of a cantilever spring 14 having its other end secured to a rotatable post 15. The post 15 is rotatably and frictionally held in a plate 16 depending downwardly from the top wall 4 of the apparatus. A positive stop member 17 extends between the end walls 2 and 3 approximately parallel to the shaft 8 and is disposed on the side of the springs 14 adjacent the shoulders 12. The post 15 to which one end of the cantilever springs 14 are secured is adapted to be rotated about an axis parallel to the shafts 8 and 17 so as to press or bias the end of the springs 14 into resilient engagement with the stop or shaft 17 to thereby adjust the bending moment in the springs 14, the post 15 being frictionally held in the plate 16 so that the spring maintains the desired tension.

Continuing with the description of a single acceleration sensing arrangement since all the arrangements are identical and referring specifically to FIGURE 2, the end of the spring 14 adjacent the shoulder 12 carries a first contact 18 of a switch generally designated by the reference numeral 19 having a second contact 20. The contact 20 comprises one end of a conductive screw 21 which is threaded into an insulating bar 22 that extends between the end walls 2 and 3. By rotating the screw 21 the spacing between the contacts 18 and 20 may be adjusted and normally is made quite small. A disc, spring and switch arrangement similar to that just described as associated with the shoulder 2 is provided adjacent the shoulder 13. A cantilever spring 23 having one end disposed in the path of clockwise rotation of the disc 9 has its other end secured in a post 24 rotatably and frictionally secured in a plate 25 extending upwardly from the bottom wall 5 of the apparatus. A stop member 26 extending between the end walls 2 and 3 is provided on the side of the spring adjacent the shoulder 13 so that tension in the spring 23 may be readily adjusted. Carried on the end of the spring 23 adjacent the shoulder 13 is an electrical contact 27 of a switch 28 which further comprises a contact 29. The contact 29 is formed at one end of a metallic screw 30 which is in threaded engagement with an insulating plate or bar 31 which extends between the end walls 2 and 3 of the apparatus. The screw 30 may be rotated to advance it towards to withdraw it from the contact 27 to adjust the spacing between the contacts of the switch 28.

Upon clockwise rotation of the apparatus 1 as viewed in FIGURE 2 of the accompanying drawings, the disc 9 tends to remain stationary due to its inertia and is therefore effectively rotated counter-clockwise so that the shoulder 13 rotates into engagement with the adjacent end of the spring 23. When the acceleration of the apparatus is sufficiently great that the mass 9 can overcome the bending moment in the spring 23, the spring 23 is deflected sufficiently to bring the contact 27 into engagement with the contact 29 thereby closing the switch 28. The occurrence of the closing of switch 28 may be sensed by an appropriate electrical circuit which for the purposes of example only is illustrated as a circuit including leads 32 and 33 connected to the contacts 27 and 29 respectively of the switch and a battery 34 and circuit utilization device 35 connected in series with the leads 32 and 33. The utilization device 35 may take any appropriate form and without intending to limit the nature of the device 35, may be a pen or spark recorder, an electrical source of illumination, an acoustical device having a predetermined tone, electrical oscillator or any other electrically actuatable apparatus which can produce an instantaneous or permanent indication of the desired phenomena.

The closure of the switch 28 is effected by clockwise rotation of the apparatus 1 whereas closure of the contacts 18 and 20 of the switch 19 is effected by counter-clockwise rotation of the apparatus. Upon counter-clockwise rotation of the apparatus the disc 9 is rotated clockwise relative thereto and if sufficient acceleration is imparted to the apparatus for the disc 9 to overcome the bending moment of the spring 14, the contacts 18 and 20 are closed. An electrical circuit identical with that described with respect to the switch 28 may be employed for sensing closure of the switch 19.

It is seen from the above that a single mass and two sets of spring biased switch contacts may be employed for sensing rotation of an apparatus in both directions about a predetermined axis. It will be noted that the mass 9 being a disc is substantially dynamically balanced and therefore will respond only to rotational acceleration. Another important feature of the apparatus of the present invention is that the adjustment of the acceleration forces to which the disc 9 responds to produce an indication of acceleration in the clockwise and counter-clockwise directions are independently adjustable. The tension in the springs 14 and 23 determined the accelerations which produce sufficient force to overcome the bending moments in the springs to produce closure of the switches. The only common element in the two units is the mass or rotatable disc 9 and once this single common factor is determined the remainder of the system is independently adjustable.

Referring again to FIGURE 1 each of the discs 9, 10 and 11 as previously indicated cooperates with separate spring means to close their associated switches 19 and 28 upon counter-clockwise and clockwise rotation, respectively of the apparatus 1. However, by appropriate adjustment of the springs 14 and 23 associated with each of the discs 9, 10 and 11 closure of the switches 19 and 28 may be controlled so that each switch is closed in response to a different angular acceleration. More specifically the springs 14 and 23 associated with the discs 9, 10 and 11 may be adjusted so that their associated switches 19 are closed in accordance with an arithmetic progression such as angular accelerations of one, two and three feet per second per second, respectively. The springs 14 may also be adjusted so that the switches 19 associated with the discs 9, 10 and 11 are closed in response to a geometric progression such as 1, 2 and 4 feet per second per second, or in accordance with some other predetermined progression. Each of the adjustments for the springs 14 for each of the discs 9, 10 and 11 is completely independent of the adjustment of the spring for each of the other discs. In consequence each discrete increment of acceleration, which can be sensed by the apparatus whether it is in a clockwise or counter-clockwise direction is completely independently selectable at the will of the user.

The apparatus may be quite compact, substantially the only limiting feature on the apparatus being the dimensions of the discs 9, 10 and 11 required to produce the desired inertial forces. The spacing between the discs may be minimal since they are independently rotatably mounted on the shaft 8 and therefore do not inter-act one with the other. An additional important feature of the apparatus of the invention is that the spacing between the contacts of the switches is completely independent of the adjustment of the bending moments of the springs. Specifically, the moment is adjusted wholly by the degree of bending imparted to the springs by rotation of the associated shaft 15 or 24 with respect to its stop member. Any variation in spacing between the contacts as a result of the variation in bending of the spring with tension may be readily eliminated or compensated for by rotation of the adjustable contact 21 or 30. Thus, a very small movement of the end of the spring 14 or 23 carrying a switch contact may be immediately detected regardless of the degree of tension in the spring. In consequence of this feature the linearities of the displacement versus force characteristics of the springs 14 and 23 is of little interest since the only accuracy required of these springs is that they be moved away from their associated stops upon a predetermined force being applied to their ends. Their characteristics once this movement has been achieved is of little importance since contact between the contacts of the switches may be affected almost immediately upon movement of the spring away from its stop. Since the required movement of the mass and spring is quite small, the instrument has a rapid response-time and may be operated well-above its natural frequency.

The mechanism for adjusting the bending moment of the springs 14 and 23 is not necessarily restricted to that illustrated and described and may readily employ fixed posts 15 and individually rotatable cams for the stop members.

The casing of the apparatus is adapted to be filled with oil or other suitable material to provide for viscous damping of the various rotating masses and springs. Since the wires which are connected to the various switch contacts such as the wires 32 and 33 must be brought out through the casing to the various electrical apparatus to be operated thereby, these wires must be brought out through fluid tight connections.

It will be noted that the apparatus of the present invention provides digital-type indications of the acceleration of its associated apparatus since the indications produced by each of the discs 9, 10 and 11 indicate that a predetermined acceleration has been achieved. Each indication is wholly independent and distinct from the indications produced by the switches associated with each of the other discs of the apparatus and in consequence several indications are produced concurrently with the highest ordered indication representing the true acceleration. By appropriate interconnection of the switch circuits a single indication may be produced.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. An angular accelerometer comprising a shaft, a plurality of rotatable masses normally mounted for free rotation in parallel planes about said shaft, a plurality of resilient means, each for resisting rotation in a different direction of a different one of said rotatable masses, means for independently varying the deflection versus force characteristic of each of said resilient means each of said resilient means normally lying out of contact with its associated mass, and means associated with each of said rotatable masses for detecting a predetermined angle of rotation in both directions of said rotatable mass.

2. An angular accelerometer comprising a plurality of rotatable discs mounted for rotation about a common axis, at least two pairs of switch contacts associated with each of said discs, a plurality of cantilever spring means, said spring means being disposed in the path of movement of, and normally spaced from said discs to resist rotation thereof in both directions, one contact of each of said pair of contacts being secured to one of said spring means, so that one pair of contacts associated with each of said discs is closed upon rotation of said disc through a predetermined angle in one direction and the other pair of contacts associated with each of said discs is closed upon rotation of said discs through a predetermined angle in the other direction, and means for adjusting the resistance of each of said spring means to rotation of its associated disc.

3. An angular accelerometer comprising a plurality of circular discs having diametrically-opposed raised shoulders, said discs being rotatable about a common axis, a plurality of pairs of spring means disposed in the path of movement of, and normally spaced from each of said shoulders to resist rotation of said discs in both directions, a plurality of pairs of switch contacts, one contact of each of said pairs being secured to a different one of said spring means, means for closing each of said pairs of contacts upon a predetermined deflection of its associated spring means and movable means for independently adjusting the resistance of each of said spring means to rotation of its associated disc.

4. An angular accelerometer comprising at least one rotatable circular disc having a pair of diametrically opposed circumferential projections, a plurality of cantilever springs with each having an unrestrained end spaced from and, disposed in oppositely directed paths of movement of different ones of said projections, means for initially subjecting said springs to at will selectable bending moments and a plurality of switches each having one contact on a different one of said springs and an adjustable contact for adjusting the spacing between said contacts of each of said switches.

5. An angular accelerometer comprising at least one freely rotatable disc, a pair of switches each having a first contact, a second contact and a spring supporting said second contact, means utilizing said springs for resisting rotation of said disc each in a direction of rotation opposite to the direction of rotation resisted by the other spring, and means for subjecting each of said springs to a selectable biasing force.

6. The combination according to claim 5 further comprising means for independently adjusting the spacing between contacts of each of the switches of said pair.

7. An angular accelerometer comprising at least one freely rotatable disc, a pair of switches each having a first contact, a second contact and a spring supporting said second contact, said springs being spaced from and disposed in the paths of opposite directions of rotation of said disc, and means for subjecting each of said springs to a preselectable biasing force.

8. The combination according to claim 7 further comprising means for independently adjusting the spacing between contacts of each of the switches of said pair.

9. An angular accelerometer comprising a plurality of freely rotatable discs, a plurality of pairs of switches, each switch including an adjustable contact, a further contact and a spring supporting said further contact, means utilizing each of said pair of switch springs to resist rotation of a different one of said discs in a different direction, and means for subjecting each of said springs to a selectable biasing force.

References Cited in the file of this patent

UNITED STATES PATENTS

| | | |
|---|---|---|
| 665,998 | Davis | Jan. 15, 1901 |
| 1,893,179 | Parsons | Jan. 3, 1933 |
| 2,310,213 | Buchanan | Feb. 9, 1943 |
| 2,412,513 | Jones et al. | Dec. 10, 1946 |
| 2,498,118 | Weiss | Feb. 21, 1950 |
| 2,535,384 | Batt | Dec. 26, 1950 |
| 2,679,296 | Morain | May 25, 1954 |

FOREIGN PATENTS

| | | |
|---|---|---|
| 459,633 | Great Britain | Jan. 12, 1937 |